Jan. 22, 1963  J. B. FREED  3,074,728
SEALS
Filed Dec. 19, 1960  2 Sheets-Sheet 1
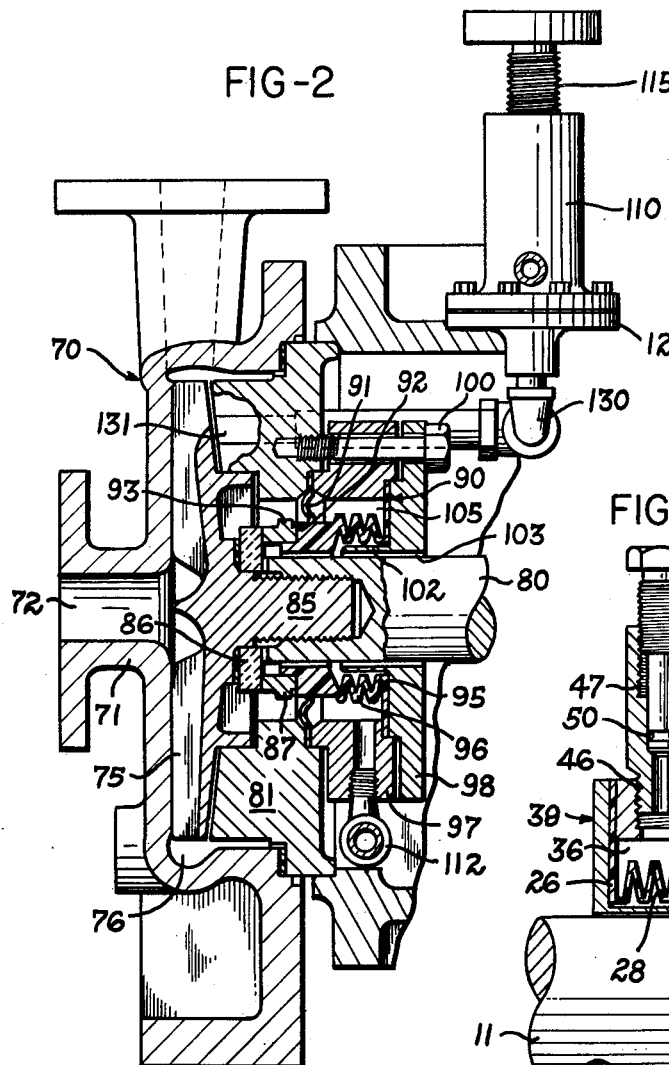
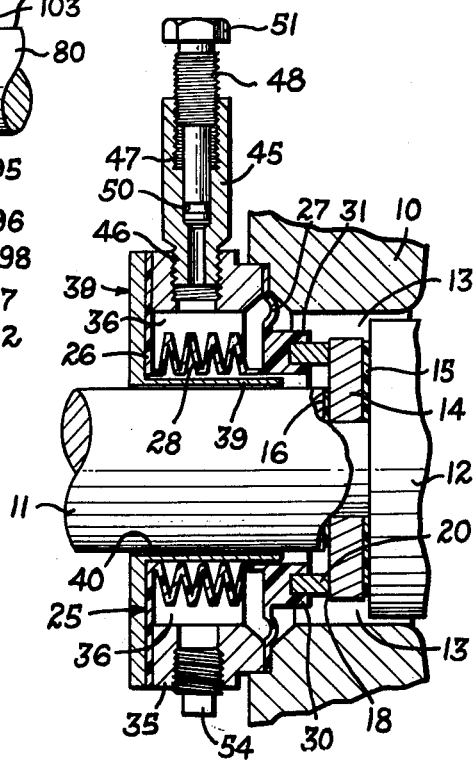
INVENTOR.
JACOB B. FREED
BY
Marechal, Biebel, French & Bugg
ATTORNEYS

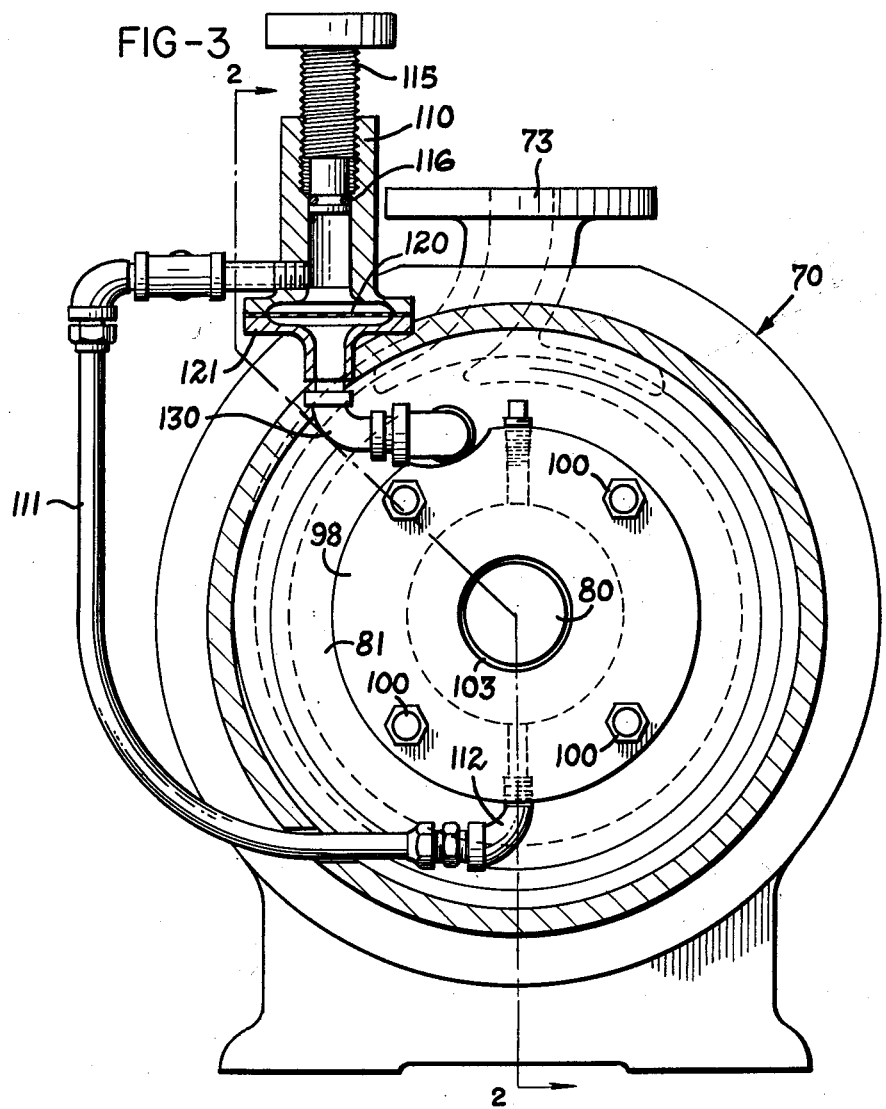

3,074,728
SEALS
Jacob B. Freed, Dayton, Ohio, assignor to The Duriron Company, Inc., Dayton, Ohio, a corporation of New York
Filed Dec. 19, 1960, Ser. No. 76,551
7 Claims. (Cl. 277—3)

This invention relates to seals, and more particularly to mechanical rotary ring seal arrangements for shafts.

Mechanical ring seals operate upon the principle of intimate fluid-excluding contact between the coacting surfaces of a rotating ring and a stationary ring. The only force required is that sufficient to assure such intimate contact, and therefore once a force differential is established on the rings, the rings are effective as a seal over a wide range of negative to positive pressures. Excess force results in frictional losses and unnecessary wear on the rings.

This invention provides a shaft sealing arrangement which maintains a desired and constant closing pressure of an axially movable sealing ring against the coacting surface of a rotary ring throughout pressure changes within the chamber being sealed. The axially movable ring is arranged to oppose the pressure in the chamber and is held into such sealing engagement by a flexible bellows member extended to maintain sealing arrangement by pressure which is confined in part by the bellows member.

Preferably, the member of the invention comprises a flexible bellows body including a movable force-transmitting wall, which may be a forward wall of the seal and which is positioned adjacent to the axially movable non-rotary ring for urging the ring into sealing engagement with the rotary ring. This movable wall is preferably connected to a relatively fixed back wall by an axially extending bellows or pleated portion which provides for the movement of the front wall against the adjacent ring under pressure from within the member. This member preferably includes radially extending walls which are sealed to the casing or housing at an annular seal gland through which the interior of the bellows body may be filled with a pressure transmitting liquid.

The seal of this invention preferably includes provision for preloading the engagement of the rings by the establishment of a static pressure of liquid within the compartment formed by the bellows body and the packing gland. An impervious and movable wall portion, which may be the front wall integral with the body or a closure wall of the force transmitting member, is positioned to be subjected to the fluid pressure within the chamber being sealed. This wall portion therefore operates to transmit the chamber pressure to the liquid encapsulated within the interior defined by the bellows body and gland for maintaining the predetermined contacting force of the axially movable sealing ring against the rotating ring on the shaft.

An advantage of this arrangement resides in the elimination of a need for a mechanical spring to maintain a positive sealing force. A further advantage resides in the ease by which compensation for wear of the rings is effected within the seal. This compensation is effected by reestablishing the desired static pressure within the interior of the bellows body, and the invention includes a convenient arrangement for establishing and maintaining such static pressure. Also, the invention is not dependent upon differential areas for the maintenance of a seal, and therefore the rings need not be subjected to increasing frictional forces with increasing chamber pressures due to such a constant area differential.

The invention has particular utility for the handling of corrosive liquids and abrasive slurries, since the operating components which are subjected to contact with the fluid in the chamber may be readily formed of corrosive-resistant material, such as Teflon. The elimination of springs and orifices, and the filling of the bellows member with a suitable neutral liquid at a higher pressure than the chamber pressure being sealed, assure that foreign material will be excluded from the exterior convolutions or folds of the bellows.

The invention has the advantage of a capability of handling abrasive materials without damage to the adjacent sealing surfaces of the rings by intrusion of foreign material between the rubbing surfaces of the rings due to jarring pressure increases, such as may be caused by a water hammer. The pressure transmitting wall portion of the seal force member is instantly responsive to transmit such pressure surges to the interior of the seal for the maintenance of contact between the rings.

It is therefore a principal object of this invention to provide a shaft seal as outlined above which effects a uniform operating pressure between relatively moving sealing rings.

Another important object of this invention is to provide a seal force member which encapsulates a non-compressible fluid together with an arrangement for pressurizing such fluid externally of the chamber being sealed.

A further object of this invention is to provide a shaft seal as outlined above having a sealing ring force member containing a liquid with a pressure transmitting wall portion exposed to the pressure within the chamber being sealed for the transmission of the pressure in such chamber to the contained liquid.

A still further object of this invention is to position a wall portion of a seal force member in such a manner that it is subjected to a pressure of uniformly higher magnitude than the pressure adjacent to the rings so as to maintain a constant force differential at the axially movable sealing ring.

It is still a further object of this invention to provide a seal as outlined above including an arrangement for the external application and maintenance of a desired static pressure on a bellows, which arrangement may be readily adjusted from time to time as necessary to compensate for the wear of the coacting sealing rings.

Another object of this invention is to provide a seal as outlined above including an axially extending bellows body with end walls which cooperate with an annular packing gland to form an interior within which a liquid may be admitted and pressurized, with one of the walls forming a pressure-transmitting wall exposed to the pressure within the chamber being sealed.

Other objects and advantages of the invention will be apparent from the following description, the accompanying drawings and the appended claims.

In the drawings:

FIG. 1 is a fragmentary section through a casing and shaft arrangement showing one embodiment of this invention in somewhat diagrammatic form;

FIG. 2 is a partially broken away section through a centrifugal pump, taken generally along the line 2—2 of FIG. 3, and showing a slightly modified form of this invention; and FIG. 3 is an end view of the pump of FIG. 2.

Referring to the drawings, which illustrate preferred embodiments of this invention, a casing 10 in FIG. 1 is shown as including a rotating shaft 11 and connected impeller 12. The shaft 11 extends from a pressure chamber 13 within the casing to a point of lower pressure at the outside of the casing 10. Rotating ring means carried on the shaft 11 includes a sealing ring 14 which is sealed at the shaft by gaskets 15 and 16 and held in place by any suitable arrangement one of which is shown in greater detail in FIG. 2. The rotating ring 14 may be formed of any suitable material which is sufficiently hard to withstand the wear, such as a case-hardened metal or a solid ceramic material, and it is formed with a radial face or surface 18 adjacent the peripheral edge thereof.

A non-rotating, axially movable cooperating sealing ring 20 is arranged to present a flat radial sealing surface for wiping engagement with the surface 18. The ring 20 may be formed of carbon or other suitable material which forms a seal with the ring 14.

Means for urging the axial engagement of the ring 20 with the rotary ring member 14, and for preventing the escape of the contents of the chamber 13 along the shaft 11, includes an expansible force member having a body indicated generally at 25. The body 25 is generally annular in form and is positioned in coaxial relation with the shaft 11, and it includes a relatively fixed back wall 26 and an axially movable front wall 27 connected by a bellows or pleated portion 28. A thickened annular ring-receiving portion 30 is formed on and carried by the front wall 27 and includes an annular slot 31 within which the ring 20 is received and held against rotation. The bellows body 25 is preferably formed of an impervious or inert material such as the polytetrafluorethylene resin sold under the trade name of Teflon although it is understood that it may be made of nylon, thin metal or other suitable material according to its intended use.

Means forming a part of the force member and sealing the outer periphery of the front wall 27 to the casing and sealing and supporting the back wall 26 includes an annular seal gland 35. The gland 35 forms a hollow annular interior compartment 36 with the body 25 within which a liquid may be received and retained. The seal further includes a seal retaining flange 38 which is mounted to retain the outer periphery of the back wall 26 in sealing relation to the gland 35. The flange 38 includes an inwardly extending foot portion 39 which supports the bellows portion 28 against inward movement and forms a running clearance at 40 between the operating portions of the seal and the shaft 11. The flange 38 and gland 35 may be secured in assembled relation to the walls 26 and 27 and the casing 10 by any suitable means, as shown in greater detail in FIG. 2.

Independent means for establishing a static pressure within the compartment 36 includes a cylinder 45 having an inner end 46 tapped through the gland 35 and an outer threaded end 47. A piston member 48 is threaded into the outer end 47 and includes an O-ring packing 50 on its inner end and a head 51 by means of which the piston may be conveniently rotated to establish a predetermined and desired static pressure of the liquid within the seal. A pressure gauge, not shown, may be threaded in place of a removable plug 54 in the gland 35 for conveniently determining the static pressure within the seal.

The seal force member includes a movable or flexible wall portion which is subject to the pressure within the chamber 13 for transmitting the pressure from this chamber into the compartment 36 to maintain the preload force over varying pressures within the chamber 13. In this embodiment, this wall portion consists of the front wall 27 which is relatively flexible and therefore forms a movable diaphragm by means of which the pressure within the chamber 13 is transmitted to the compartment 36.

In the operation of the invention as shown in FIG. 1, the compartment 36 is filled with a suitable non-compressible liquid, such as oil, and is preferably bled to remove all air. The piston 48 is rotated at the head 51 to establish a desired pressure within the compartment 36 to effect a preload sealing force on the ring 20. For example, this may be in the order of 5 to 10 p.s.i. This pressure operates to move the front wall forwardly carrying with it the sealing ring 20 for engagement with the adjacent peripheral edge of the rotating ring member 18.

It is expected that the chamber 13 within the casing 10 will be subjected to varying fluid pressures which are to be sealed against escape by the device of this invention. Such pressures are substantially instantly transmitted to the compartment 36 through the movement of the forward wall 27 exposed at its outer surface to the chamber 13 so that the axial force in the sealing direction is maintained constant over a wide range of operating pressures within the chamber 13. Thus, the front wall consists of a diaphragm for transmitting the chamber 13 pressures to the compartment 36.

The embodiments of FIGS. 2 and 3 shows a slightly modified form of the invention as applied to the shaft of a centrifugal pump 70. The pump 70 includes a casing 71 having a fluid inlet 72 and a discharge outlet 73. A rotor or impeller 75 is rotatably received within the pumping chamber or cavity 76 on a rotating shaft 80. A rear cover 81 closes the back of the pump and forms a running clearance with the impeller 75.

The impeller preferably includes a threaded stud 85 upon which the shaft 80 is mounted and which supports a rotating sealing ring 86. An axially movable sealing ring 87 is supported for wiping engagement with the ring 86, and these components may be formed of the material described above in connection with the rings 14 and 20.

A force-applying member includes a bellows body 90, similar to the body 25 of FIG. 1, with a forward wall 91 on which is formed a ring-carrying foot 92. The ring 87 is formed with tabs or ears 93 for engagement with cooperating slots formed in the foot 92 to key the ring 87 against rotation.

An integral back wall 95 is separated from the front wall 91 by a pleated bellows portion 96, and the outer peripheral portions of the walls 91 and 95 form a seal at an annular gland 97. A seal retaining flange 98 is secured against the gland 97 at the back wall 95 by a plurality of bolts 100 and includes an inwardly extending foot portion 102 which supports the bellows portion 96 and forms a running clearance 103 with the shaft 80.

Means for establishing and maintaining a static pressure within the interior compartment 105 formed by the body 90 and gland 97 includes an externally mounted cylinder member 110, shown in section in FIG. 3. The member 110 is connected to the compartment 105 through a suitable conduit 111 and a tapped fitting 112 within the gland 97. A piston plunger 115 is threaded in the member 110 for axial movement therein and includes suitable packing such as an O-ring 116 by means of which a static pressure may be created within the compartment 105 to preload the ring 86.

Means for transmitting the pressure of the chamber 76 of the pump to the liquid in the compartment 105 of the bellows body 90 includes a diaphragm 120 (FIG. 3) secured by a diaphragm housing 121 to the member 110. The diaphragm 120 forms, in effect, a flexible impervious wall portion of the seal force member and operates to transmit pressures from the chamber 76 into the compartment 105 of the seal body 90 and gland 97 through the conduit 111. The upper surface of the diaphragm 120, in FIG. 3, forms one wall of the compartment 105 and the lower surface is subjected to pressure from within the chamber 76. The diaphragm 120 operates in lieu of, or in addition to, the forward wall 91 as a pressure-transmitting medium. In many applications the front wall of the body 90 or 25 may have insufficient flexibility for properly transmitting the pressures, and in such cases the diaphragm 120 is useful for this purpose.

In the embodiment of FIGS. 2 and 3, a positive pressure differential is assured during the running of the pump for the purpose of maintaining a seal by exposing the diaphragm 120 to pressure within the chamber 76 at a point which has a positive pressure differential over the pressure at the rings 86 and 87. This is accomplished by connecting the housing 121 at space beneath the diaphragm 120 with tubing 130 which extends into a tapped opening 131 formed in the rear cover 81. The opening 131 opens into the chamber 76 at a point radially outwardly of the center of the rotor. The pressure differential which is therefore established is substantially constant throughout the operation of the pump and accordingly effects a constant pressure differential, in addition to the preload pressure effected by the piston 115 within the compartment 105. It is seen that the force developed by this pressure differential is not dependent upon differential areas and is accordingly constant irrespective of changes of absolute pressure within the chamber 76.

It is within the scope of this invention to pre-load or create a static pressure within the interior of the seals of the embodiments of FIGS. 1 and 2 by additional means, such as by sealing a liquid therein under static pressure. A further arrangement suitable for this purpose is to cause a force to be exerted on a movable wall member of the seal, such as the wall 26 of FIG. 1, by providing a threaded back wall on the gland 35 which may be rotated against the wall 26 to establish a desired pressure within the seal. Also, solenoids and the like may be employed to exert a force against the movable wall portion, to effect a desired pre-load.

It is therefore seen that this invention provides a mechanical seal for rotating shafts and the like which eliminates springs, and which is simple to maintain over an extended period of use. The invention has been found to be effective in increasing the life of the sealing rings due to the precise regulation of pressure which may be effected and maintained. This invention is effective to maintain a desired axial force on the ring members with either positive or negative pressures in the chambers being sealed, such as would occur in sealing the shaft of a rotary pump.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A device for sealing a pressure chamber at a rotary shaft extending through a fixed casing, comprising a ring member on said shaft for rotation therewith, an axially movable sealing ring arranged for rubbing engagement with said ring member and forming a rotary seal therewith, means for urging the engagement of said sealing ring with said ring member to prevent the escape of the contents of said chamber along said shaft including an expansible force-transmitting member having a movable portion adjacent said ring arranged to urge said ring axially into engagement with said ring member, means in said force-transmitting member forming a totally enclosed compartment adapted to be filled with a pressure transmitting liquid under pressure for effecting said axial movement of said sealing ring, and movable wall means on said force transmitting member exposed to the pressure in said chamber for the transmission of chamber pressure to the liquid in said compartment.

2. A device for sealing a pressure chamber at a rotary shaft extending through a fixed casing, comprising a ring member on said shaft for rotation therewith, an axially movable sealing ring arranged for rubbing engagement with said ring member and forming a rotary seal therewith, means for urging the engagement of said sealing ring with said ring member to prevent the escape of the contents of said chamber along said shaft including an axially movable force-transmitting member having a movable portion adjacent said ring connected to urge said ring into engagement with said member, means in said force-transmitting member forming a totally enclosed compartment adapted to be filled with a pressure transmitting liquid under pressure for effecting said axial movement of said sealing ring, said movable portion forming wall means exposed to the pressure in said chamber for the transmission of chamber pressure to the liquid in said compartment for the maintenance of a force differential urging said ring into said engagement over a wide range of pressures in said chamber.

3. A device for sealing a pressure chamber at a rotary shaft extending through a fixed casing, comprising a ring member on said shaft for rotation therewith, an axially movable sealing ring arranged for rubbing engagement with said ring member and forming a rotary seal therewith, means for urging the engagement of said sealing ring with said ring member to prevent the escape of the contents of said chamber along said shaft including an annular force-transmitting member with a body having a movable wall adjacent said ring arranged to urge said ring into engagement with said ring member and an opposite wall fixed in relation to said casing, means totally enclosing said body forming a compartment arranged to be filled with a pressure transmitting liquid, means connected to said compartment for pressurizing the liquid therein for urging said movable wall and ring into sealing engagement with said ring member, and at least one flexible diaphragm portion forming a wall of said body exposed to the pressure in said chamber for the transmission of chamber pressure to the liquid in said compartment.

4. A device for sealing a pressure chamber at a rotary shaft extending through a fixed casing, comprising a ring member on said shaft for rotation therewith, an axially movable sealing ring arranged for rubbing engagement with said ring member and forming a rotary seal therewith, means for urging the engagement of said sealing ring with said ring member to prevent the escape of the contents of said chamber along said shaft including an annular expansible bellows having a movable wall adjacent said ring arranged to urge said ring into engagement with said member and an opposite wall fixed in relation to said casing, means encircling said bellows forming an annular closed compartment on a side of said bellows remote from said shaft arranged to be filled with a pressure transmitting liquid, and a piston and cylinder assembly connected to said bellows for pressurizing the liquid therein for urging said movable wall and ring into sealing engagement with said member and adjustable to maintain said engagement to compensate for wear of said sealing ring.

5. A device for sealing a pressure chamber at a rotary shaft extending through a fixed casing, comprising a ring member on said shaft for rotation therewith, an axially movable sealing ring arranged for rubbing engagement with said ring member and forming a rotary seal therewith, means for urging the engagement of said sealing ring with said ring member to prevent the escape of the contents of said chamber along said shaft including an annular expansible bellows having a movable wall adjacent said ring arranged to urge said ring into engagement with said member and an opposite wall fixed in relation to said casing, means cooperating with said bellows forming a totally enclosed liquid compartment arranged to be filled with a pressure transmitting liquid, a liquid displacing cylinder and piston assembly connected to said bellows for establishing an initial pressure in said compartment for urging said movable wall and ring into sealing engagement with said member with a predetermined force, and said bellows including a flexible wall portion having one surface exposed to the pressure in said chamber for the transmission of chamber pressure to the liquid in said compartment to maintain said force constant over a wide range of chamber pressures.

6. A mechanical seal for sealing a pressure chamber at a rotating shaft extending through a fixed casing, comprising an annular seal supporting gland fixed to said casing adjacent said shaft, rotating sealing ring means carried on said shaft, an axially movable sealing ring arranged for wiping engagement adjacent a peripheral edge of said rotating ring means for sealing said shaft in said pressure chamber, means for urging said ring into engagement with said means throughout a variable range of pressures in said chamber while maintaining a predetermined and substantially constant contact force therebetween including a flexible seal body received within said gland adjacent said shaft, said body including a relatively fixed back wall and axially movable front wall integrally connected by a pleated bellows portion, said front and back walls forming a seal with said gland thereby defining a hollow annular compartment on the side of said bellows remote from said shaft, said front wall arranged in force applying relation to said ring for urging said ring into engagement with said means, means independent of said pressure chamber for preloading said seal body at said compartment with a liquid under pressure, and means for transmitting pressure from said chamber into said seal compartment to maintain said preload over varying pressures in said chamber.

7. A mechanical seal for sealing a pressure chamber at a rotating shaft extending through a fixed casing, comprising an annular seal supporting gland fixed to said casing adjacent said shaft, rotating sealing ring means carried on said shaft, a sealing ring arranged for wiping engagement adjacent a peripheral edge of said rotating ring means for sealing said shaft in said pressure chamber, means for urging said ring into engagement with said means throughout a variable range of pressures in said chamber while maintaining a desired contact force therebetween including a force transmitting flexible seal body received within said gland adjacent said shaft and including a relatively fixed radially extending back wall and axially movable radially extending front wall integrally connected by a pleated bellows portion, said front wall forming a closure wall of said chamber and having means for supporting said sealing ring, said front and back walls forming a seal with said gland thereby defining a hollow annular compartment on the side of said bellows remote from said shaft, means independent of said pressure chamber for preloading said seal body at said compartment with a liquid under pressure, and means forming a flexible wall having a surface exposed to said compartment for transmitting pressure from said chamber into said seal compartment to maintain said preload over varying pressures in said chamber.

References Cited in the file of this patent
UNITED STATES PATENTS

| | | |
|---|---|---|
| 2,033,403 | Smittle | Mar. 10, 1936 |
| 2,497,479 | Vlach | Feb. 14, 1950 |
| 2,504,596 | Carter | Apr. 18, 1950 |
| 2,577,292 | Weber | Dec. 4, 1951 |